United States Patent Office 2,720,473
Patented Oct. 11, 1955

2,720,473

POTASSIUM-SUPPLYING WELDING FLUX INGREDIENT

John W. Donahey, Paoli, Pa., assignor to Foote Mineral Company, Philadelphia, Pa., a corporation of Pennsylvania No Drawing. Application June 9, 1953, Serial No. 360,605

4 Claims. (Cl. 148—26)

The present invention relates to a novel composition of matter particularly adapted for use as an ingredient in a welding flux composition; and, more particularly, the invention relates to a novel potassium-containing composition in the form a a fritted glass which is particularly adapted for use as an ingredient in a welding flux composition coating on a welding electrode for supplying potassium as an arc-stabilizing agent. The invention also relates to a novel welding flux composition, particularly in the form of a coating on a welding electrode, comprising the said potassium-containing composition, and to a welding rod coated with such flux composition.

In the art of arc welding, it has long been known that potassium present in the flux coating on the welding electrode is capable of exerting a pronounced effect upon the stability of the arc. It has, therefore, become common practice to include in the welding electrode flux coating a compound or compounds of potassium. Of the common forms in which the potassium is introduced into the coatings, potassium feldspar has been generally preferred because of its low cost and good chemical stability. However, the high silica and alumina content of this mineral precludes its use in many types of coating formulations, particularly in the basic type coatings which are predominantly lime and which do not form glassy slags. In such cases, potassium has been added as a soluble potassium silicate, or as the hydroxide or carbonate. In the latter two instances, the hydroxide or carbonate has usually been predissolved in soluble potassium or sodium silicate solution and the resulting solution added to the coating composition mixture to act as a binder and extrusion aid. The amount of potassium that can be introduced in this manner is limited due to the fact that either compound, when dissolved in a soluble silicate, alters the viscosity and other physical characteristics of the silicate solution, and thus imposes certain limitations on the manufacturing procedure.

Even when the manufacturing problems are successfully surmounted, the presence of potassium silicate, potassium carbonate or potassium hydroxide in a welding electrode coating has one very deleterious effect. These materials are all hygroscopic, and tend to absorb large quantities of moisture from the atmosphere into the coating. This effect is undesirable in any type coating, since the performance of the coated electrode will vary according to the moisture content and thus manufacture of electrodes of consistent operating characteristics is virtually impossible.

Moreover, in recent years a type of flux coated welding electrode known as the "low hydrogen" electrode has come into considerable use. This electrode is employed in applications where very high strength weld metal is required, and its effectiveness depends, in part, on a very low content of moisture in the flux coating in order to avoid hydrogen embrittlement of the weld metal. The use of potassium silicate, potassium carbonate or potassium hydroxide in flux coatings for low hydrogen-type welding electrodes obviously causes difficulty.

In an attempt to reduce moisture reabsorption, a material known commercially as "potassium titanate" has been employed to supply the potassium in the electrode coating. This material, as commonly supplied, has the approximate molar composition—$K_2O \cdot 5TiO_2$. Although this material is less soluble in water than potassium silicate, potassium hydroxide or potassium carbonate, and is somewhat less hygroscopic than these compounds, it still possesses sufficient hygroscopicity and solubility to give rise to difficulties as a welding electrode coating constituent. It has been found further that this material varies in behavior with age. The same lot of material will have different effects upon the viscosity and plasticizing properties of the soluble silicates or alginates employed as binders and extrusion aids, depending upon the length of time the material has been stored, and upon the storage conditions. It is believed that potassium titanate forms potassium hydroxide by reaction with the water absorbed by it. This in turn reacts with the soluble silicate or the alginate, causing chemical breakdown and loss of plasticizing and binding properties. In order to avoid these manufacturing difficulties, it has normally been necessary to employ freshly prepared potassium titanate. Even so, when the potassium titanate is present in the welding electrode coating, it is sufficieintly hygroscopic to cause difficulty, particularly in the "low hydrogen" type of electrode, due to moisture reabsorption.

It is the principal object of the present invention to provide a potassium-containing composition which is insoluble in water and which is hydrophobic, that is to say, possesses no significant hygroscopicity, and which is otherwise highly suited for use as a constituent in welding electrode flux coatings.

It is a further object of the invention to provide a potassium-containing composition which is not only insoluble and non-hygroscopic but which is also low in silica and alumina and which is high in its potassium content.

Other objects including the provision of an improved welding electrode flux composition, particularly in the form of a coating on a welding electrode, and a flux coated welding electrode, which affords a high degree of stabilization of the arc during welding without, however, presenting the difficulties encountered when the usual potassium-containing materials are employed as arc stabilization agents, will become apparent from a consideration of the following specification and claims.

The novel potassium-containing composition of the present invention is a water-insoluble, non-hygroscopic glass in the form of a frit having an analysis comprising between about 20% and about 33% of $K_2O$; between about 20% and about 40% of $TiO_2$, and between about 17% and about 40% of $SiO_2$, the sum of the $K_2O$ and $TiO_2$ and $SiO_2$ making up between about 75% and about 94% of the glass; at least one divalent oxide selected from the group consisting of CaO (in an amount between about .5 and about 10%), MgO (in an amount between about .1 and about 8%) and MnO (in an amount between about .5 and about 15%), and at least one of the trivalent oxides selected from the group consisting of $Fe_2O_3$ (in an amount between about .1 and about 15%), $B_2O_3$ (in an amount between about .5 and about 20%), and $Al_2O_3$ (in an amount between about .1 and about 8%). The glass will contain no more than about 5% of other oxides such as $Cr_2O_3$, NiO, $WO_3$, $MoO_3$, $V_2O_5$, $CeO_2$, and the like. In other words, the $K_2O$, $TiO_2$, $SiO_2$, divalent oxide and trivalent oxide will make up at least about 95% of the glass.

The preferred glass frit of the present invention will comprise between about 24% and about 29% of $K_2O$; between about 22% and about 33% of $TiO_2$, and between about 24% and about 32% of $SiO_2$, the sum of the $K_2O$ and $TiO_2$ and $SiO_2$ making up between about 78% and about 90% of the glass; at least one of the divalent oxides selected from the group consisting of CaO (in an amount between about 1 and about 6%), MgO (in an amount between about 1 and about 3%) and MnO (in an amount between about 3 and about 10%), and at least one of the trivalent oxides selected from the group consisting of $Fe_2O_3$ (in an amount between about 4% and about 10%), $B_2O_3$ (in an amount between about 1% and about 10%) and $Al_2O_3$ (in an amount between about 2% and about 5%). In this preferred glass of the invention, there will be no more than about 3% of other oxides, such as $Cr_2O_3$, NiO, $WO_3$, $MoO_3$, $V_2O_5$, $CeO_2$, and the like. In other words, the $K_2O$, $TiO_2$, $SiO_2$, divalent oxide and trivalent oxide will make up at least about 98% of the glass. The percentages referred to in this and the preceding paragraph are percentages by weight.

It will be noted from the foregoing that the content of potassium in the glass frit is relatively high as compared to certain of the potassium-supplying materials previously used, e. g. potassium feldspar, so that smaller quantities of the composition are required to provide a given potassium content in the coating. Further in this connection, it will be noted that the content of silica and of alumina is relatively low and this is to be contrasted to potassium feldspar wherein the acid oxides, i. e. alumina and silica, are unfavorably high. In view of the materials making up the glass, it was wholly unexpected that a glass could even be formed containing as little as 40% $SiO_2$, much less silica contents below 40% and as low as about 20%. It will also be noted that the glass contains a substantial amount of $TiO_2$. As is known in ceramic practice, $TiO_2$ is an excellent opacifier, and numerous enamel compositions are based on the recrystallization of $TiO_2$ from the molten vitreous enamel. This recrystallization is based on the very low solubility of $TiO_2$ of most glass compositions. It is most unexpected, therefore, that the glasses of the present invention are completely homogeneous. Finally, glasses of the present invention are insoluble in water and non-hygroscopic. Glasses high in $K_2O$ are notoriously soluble, and, as pointed out above, many potassium compounds are relatively hygroscopic. The unusual insolubility and non-hygroscopic properties of the glasses of the present invention are, therefore, wholly unexpected. This combination of high potassium content, low silica content, insolubility and non-hygroscopicity in a homogeneous glass frit, therefore, provides a material which is ideally adapted for inclusion in a welding electrode flux coating to supply potassium for arc stabilization.

As stated, the glass composition of the present invention is in the form of a frit in relatively fine particle size for ready incorporation with the other flux ingredients and application to the welding rod. The glass frit may be prepared in accordance with conventional frit-making practice. As is well known, in preparing a frit, materials providing ultimately the desired analysis—in the present case materials providing the above set forth oxide analysis—are mixed together and melted. With respect to the materials employed to provide the desired composition, such materials may be selected from a wide range of well known compounds and minerals, and the provision of the above-described oxide analysis will present no problems to those skilled in the art. Thus, the $K_2O$ may be provided by potassium carbonate, potassium nitrate, potassium hydroxide, and the like; the $TiO_2$ may be provided by rutile, titanite, ilmenite, titaniferous slags, titanates, and the like. The $SiO_2$ may be used as such or it may be provided by other compounds and minerals such as silicates. The divalent and trivalent oxides may be used as such or may be provided by other compounds. For example, such oxides may be present in certain of the minerals used to provide the other oxides of the formula. During melting, of course, volatile constituents will be liberated and driven off. For example, where carbonates are employed, carbon dioxide will be driven off.

The materials providing the desired chemical analysis within the ranges set forth above upon melting thereof, are mixed together in accordance with common practice and heated to an elevated temperature to provide a clear, pourable, molten mass. With compositions corresponding to the analysis set forth above, temperatures between about 2200 and 2300° F. may be employed.

The molten mass is then quickly chilled, such as by pouring it into a water bath, and such quick chilling causes the glassy mass to fracture into small pieces. These small pieces are recovered and dried to provide a frit having the desired chemical analysis.

The resulting frit may be too coarse for direct use, and may, therefore, require grinding. The grinding may be carried out in conventional grinding apparatus, for example, in a jar mill, (a small sized, pebble mill comprising a vitreous porcelain jar and gasketed porcelain lid and generally charged with porcelain balls or flint pebbles) rod mill, or the like. Grinding reduces the coarse frit to the desired fine particle size. Generally, the particle size of the ground frit will be less than about 40 mesh and may be as fine as 325 mesh or finer.

In preparing a flux coating comprising the novel glass frit of the present invention, a minor proportion of the glass frit is mixed with the desired welding flux ingredients and a suitable binder. The specific welding flux ingredients employed, as is well known, may be selected from a wide variety of materials depending upon many factors, including the type of weld metal, the type of metal being welded, the conditions of welding, certain properties desired in the coating, e. g. whether it will provide a shielded arc or not, and the like. The types and combinations of flux ingredients with which the present glass frit is incorporated, are immaterial from the standpoint of the present invention.

In general, welding flux ingredients are inorganic substances which are relatively stable at temperatures below about 1250° F. and which are relatively insoluble in water. By way of illustration, the following flux ingredients are given: carbonates (especially for use in shielded-arc flux coatings), such as calcium carbonate, magnesium carbonate, dolomite, lithium carbonate, and the like; fluorides, such as calcium fluoride, sodium fluoride, lithium fluoride, cryolite, fluorspar, and the like; oxides, such as iron oxide (e. g. hematite and/or magnetite), manganese oxide [e. g. manganese ore, hausmannite ($Mn_3O_4$) and/or mangenous oxide], silicon dioxide, titanium dioxide (e. g. rutile and/or ilmenite), zirconium dioxide, nickel oxide, columbium oxide, and the like; silicates, such as aluminum silicate (e. g. glass, mica, feldspar, pyrophyllite, lepidolite, spodumene, etc), calcium silicate (e. g. wollastonite), magnesium silicate (e. g. asbestos, talc, etc.), and the like; titanates; metallics for alloying with the weld metal, such as ferromanganese, ferrosilicon, ferrotitanium, ferrochromium, ferrozirconium, ferrovandium, ferrocolumbium, iron, silicon, manganese, tungsten, molybdenum, and the like.

With respect to the binder employed, it may be, in accordance with the broader aspects of the present invention, any of the binding materials conventionally employed in the preparation of flux coatings, such as the soluble sodium or potassium silicates, gums, e. g. alginates, and the like. A particularly advantageous binding material, however, is that disclosed in copending application Ser. No. 241,900, filed August 14, 1951, now Patent Number 2,697,159. In accordance with said copending application, there is employed a low melting, hydrophobic, water-insoluble glass frit which, when mixed with the other flux ingredients, the mixture applied to the welding rod and the assembly heated, softens and wets both the other flux ingredients and the welding electrode. Thus, when the assembly is cooled the discrete particles of flux ingredients are bonded to each other and to the welding electrode by means of the low melting, hydrophobic, water-insoluble glass. In this connection, a particularly advantageous glass for use as a flux coating binder is one having an analysis comprising oxides of at least two of the alkali metals selected from the group consisting of sodium, potassium, lithium and rubidium in an amount between about 20 mol percent and about 40 mol percent; at least one of the divalent metal oxides selected from the group consisting of CaO, MgO, SrO, CdO, MnO, FeO, CoO, and NiO in an amount between about 5 mol percent and about 20 mol percent, the total of said alkali metal and divalent metal oxides being between about 30 mol percent and about 55 mol percent, and the mol ratio of said alkali metal oxides to said divalent metal oxide being between about 2 to 1 and about 8 to 1; $SiO_2$ in an amount between about 30 mol percent and about 60 mol percent, and $TiO_2$ in an amount between about 2 mol percent and about 25 mol percent. Preferably, the glass also comprises fluorine up to an amount equivalent to about 20 mol percent of $Na_2F_2$, $B_2O_3$ in an amount up to about 40 mol percent and/or a trivalent oxide selected from the group consisting of $Fe_2O_3$ and $Al_2O_3$ in an amount up to about 10 mol percent.

In preparing the flux coating, the materials making up the coating will be in relatively fine particle size. As is well known, the exact particle size of the particular ingredients may vary somewhat depending upon considerations known in the welding art. Often it is desired to employ a combination of extremely fine material with somewhat coarser materials, and the particle size distribution selected will present no problem to one skilled in the art. In general, the particle size of the materials will not be greater than about 40 mesh. While the fineness of the materials may be anything below this figure, usually the average particle size thereof will not be less than about 325 mesh.

The glass frit of the present invention is merely mixed with the other flux coating ingredients, and for this purpose any mixing device, such as a Z-bladed mixer or edge runner mill, may be employed. The proportion of the glass frit of the present invention to the other flux ingredients in the mixture may vary widely, depending upon the presence or absence of other potassium-containing compounds in the mixture and upon the amount of arc-stabilization through the presence of potassium-containing material desired in any particular case. In general, however, the glass frit of the present invention will make up between about 3% and about 10% of the other coating ingredients.

In applying the flux mixture to the electrode, a liquid is incorporated in the mixture, the amount of liquid being sufficient to provide a plastic mass capable of being applied to the electrode. When a soluble silicate, gum, or the like, is employed as a binder, a solution of such material in water will serve this purpose. When the glass binder of the above-discussed copending application is employed, water may be incorporated in the mixture. The resulting wet mixture will be in the form of a plastic mass which may range from a stiff, dough-like body suitable for application by extrusion under pressure, to a thin, fluid slurry suitable for application by dipping, spraying, brushing, and the like. The coating composition may then be applied to a welding electrode following conventional coating procedures.

The present invention is not concerned with the particular electrode to which the coating is applied. The electrode itself, as is well known, may vary widely as to size, form, and composition. So far as size is concerned, the present commercial electrodes range from a wire of about 3/32 inch in diameter up to a rod having a diameter of about 7/16 inch. The electrodes are generally cylindrical in form, and generally solid, although hollow rods may be employed in certain instances. The metal from which the electrode is made depends upon various factors, including the type of metal to be welded. Thus, when carbon steel is to be welded, the electrode will also be of carbon steel, that is, a steel containing between about 0.1% and about 0.35% carbon. On the other hand, where alloys are to be welded, the electrode may be of such alloys.

The preparation of the novel glass frit and of flux coating compositions comprising the frit of the present invention will be more clearly understood from a consideration of the following specific examples which are given for the purpose of illustration only and are not intended to limit the scope of the invention in any way.

The following table sets forth the composition of representative glass frits prepared in accordance with the present invention.

|  | I | II | III | IV | V | VI | VII | VIII | IX | X | Potassium Titanate |
|---|---|---|---|---|---|---|---|---|---|---|---|
| $K_2O$ | 27.5 | 33.0 | 28.3 | 32.5 | 25.9 | 29.3 | 26.1 | 29.1 | 27.3 | 26.5 | 17–19. |
| MnO | 2.4 |  | 5.4 | 8.3 | 5.7 |  | 4.3 | 5.9 | 5.4 | 4.4 |  |
| SrO | 3.1 |  |  |  |  |  |  |  |  |  |  |
| $Na_2O$ |  |  |  |  | 2.5 |  |  |  |  |  |  |
| $ZrO_2$ |  |  |  |  |  | 8.3 | 1.2 | 2.5 |  | 1.4 | up to 1%. |
| MgO |  |  |  |  |  |  | 2.4 |  | 4.6 |  | up to 2%. |
| CoO |  |  |  |  |  |  |  | 2.4 | 2.2 | 2.3 |  |
| $SiO_2$ | 17.6 | 19.7 | 23.6 | 20.7 | 23.6 | 26.9 | 30.3 | 26.2 | 2.7 | 2.5 | up to .4%. |
| $TiO_2$ | 36.3 | 34.1 | 36.7 | 38.5 | 36.1 | 35.5 | 29.0 | 27.6 | 24.7 | 29.4 | up to 1.5%. |
| $Fe_2O_3$ | 13.0 | 13.2 | 6.0 |  | 6.2 |  | 6.7 | 4.7 | 25.7 | 24.6 | 71–74%. |
| $Al_2O_3$ |  |  |  |  |  |  |  | 3.6 | 4.3 | 4.8 | up to 3%. |
|  |  |  |  |  |  |  |  |  | 3.1 | 3.8 | up to 1.5%. |

*Example XI*

The compositions of the present invention are tested for hygroscopicity and compared with potassium titanate as follows: A sample of the frit of Example X of the above Table and a sample of potassium titanate of commerce, each predried, are stored at 75% relative humidity for 5 days. The weight gain was then measured with the following results.

Weight gain per cent
Frit of Example X _____ 2.33
Potassium titanate _____ 4.18

Since the particle size has an effect upon moisture absorption, it is pointed out that the frit of Example X was actually finer than the potassium titanate employed. The frit of Example X, by sieve analysis, was 85% through a 325 mesh whereas the potassium titanate was only 71.5% through a 325 mesh.

From the foregoing it is seen that the composition of the invention is about half as susceptible to moisture pick-up as potassium titanate, although the frit of Example X contains 50% more $K_2O$ than does potassium titanate.

*Example XII*

In making up a welding electrode coating the frit of

Example X is mixed with other flux coating ingredients in the following proportions:

| | Parts |
|---|---|
| High carbon ferromanganese | 4.0 |
| Ferrotitanium | 4.0 |
| Ferrosilicon | 4.0 |
| Calcium carbonate | 23.0 |
| Calcined alumina | 13.0 |
| Fluorspar | 13.3 |
| Rutile | 12.3 |
| Clay | 2.0 |
| Sodium alginate | 1.0 |
| Glass bond [1] | 15.0 |
| Frit of Example X | 8.4 |
| Water | 16.5 |

[1] A water-insoluble, non-hygroscopic frit having the following analysis: $Li_2O$—3.9%, $K_2O$—9.0%, $Na_2O$—14.9%, MnO—1.7%, $Al_2O_3$—8.4%, $TiO_2$—11.0%, CaO—4.9%, $SiO_2$—41.1% and F—5.9% (reported separately), and fusible at a low temperature to bond the ingredients to each other and to the welding rod.

The above mixture is extruded around a welding rod, and the assembly is heated to about 1175° F. for 5 minutes to cause softening of the glass bond, then cooled.

When potassium titanate which had been stored for 6 months was substituted for the frit of Example X, in the foregoing formulation, the material could not be extruded. This is believed to be due to a reaction between potassium hydroxide in the potassium titanate (formed by reaction between potassium titanate and its own water of hygroscopicity) and the sodium alginate which leads to chemical breakdown and loss of film-forming properties of the latter.

When the frit of Example X was stored for 6 months and used in the foregoing formulation, extrusion was perfectly satisfactory.

Considerable modification is possible in the selection of the various materials used in making up the glass frit of the invention and in the proportions thereof, as well as in the selection of the various ingredients used in making up welding electrode coatings without departing from the scope of the present invention.

I claim:

1. A water-insoluble, hydrophobic composition in the form of a glass frit consisting essentially of between about 20% and about 33% of $K_2O$; between about 20% and about 40% of $TiO_2$, and between about 17% and about 40% of $SiO_2$, the sum of the $K_2O$ and $TiO_2$ and $SiO_2$ making up between about 75% and about 94% of the glass; at least one of the divalent oxides selected from the group consisting of CaO in an amount between about .5 and about 10%, MgO in an amount between about .1 and about 8% and MnO in an amount between about .5 and about 15%, and at least one of the trivalent oxides selected from the group consisting of $Fe_2O_3$ in an amount between about .1 and about 15%, $B_2O_3$ in an amount between about .5 and about 20%, and $Al_2O_3$ in an amount between about .1 and about 8%, all percentages recited herein being on a weight basis.

2. A water-insoluble, hydrophobic composition in the form of a glass frit consisting essentially of between about 24% and about 29% of $K_2O$; between about 22% and about 33% of $TiO_2$, and between about 24% and about 32% of $SiO_2$, the sum of the $K_2O$ and $TiO_2$ and $SiO_2$ making up between about 78% and about 90% of the glass; at least one of the divalent oxides selected from the group consisting of CaO in an amount between about 1 and about 6%, MgO in an amount between about 1 and about 3% and MnO in an amount between about 3 and about 10%, and at least one of the trivalent oxides selected from the group consisting of $Fe_2O_3$ in an amount between about 4 and about 10%, $B_2O_3$ in an amount between about 1 and about 10% and $Al_2O_3$ in an amount between about 2 and about 5%, all percentages recited herein being on a weight basis.

3. A flux-containing welding electrode coating comprising a mixture of particles of welding flux ingredients and of a water-insoluble, hydrophobic glass frit consisting essentially of between about 20% and about 33% of $K_2O$; between about 20% and about 40% of $TiO_2$, and between about 17% and about 40% of $SiO_2$, the sum of the $K_2O$ and $TiO_2$ and $SiO_2$ making up between about 75% and about 94% of the glass; at least one of the divalent oxides selected from the group consisting of CaO in an amount between about .5 and about 10%, MgO in an amount between about .1 and about 8% and MnO in an amount between about .5 and about 15%, and at least one of the trivalent oxides selected from the group consisting of $Fe_2O_3$ in an amount between about .1 and about 15%, $B_2O_3$ in an amount between about .5 and about 20%, and $Al_2O_3$ in an amount between about .1 and about 8%, all percentages recited herein being on a weight basis.

4. A flux-containing welding electrode coating comprising a mixture of particles of welding flux ingredients and of a water-insoluble, hydrophobic glass frit consisting essentially of between about 24% and about 29% of $K_2O$; between about 22% and about 33% of $TiO_2$, and between about 24% and about 32% of $SiO_2$, the sum of the $K_2O$ and $TiO_2$ and $SiO_2$ making up between about 78% and about 90% of the glass; at least one of the divalent oxides selected from the group consisting of CaO in an amount between about 1 and about 6%, MgO in an amount between about 1 and about 3% and MnO in an amount between about 3 and about 10%, and at least one of the trivalent oxides selected from the group consisting of $Fe_2O_3$ in an amount between about 4 and about 10%, $B_2O_3$ in an amount between about 1 and about 10% and $Al_2O_3$ in an amount between about 2 and about 5%, all percentages recited herein being on a weight basis.

References Cited in the file of this patent

UNITED STATES PATENTS

| 1,909,217 | Notvest | May 16, 1933 |
| 1,925,560 | Kinzie et al. | Sept. 5, 1933 |
| 2,344,621 | Lemmerman | Mar. 21, 1944 |
| 2,590,893 | Sanborn | Apr. 1, 1952 |
| 2,660,531 | Fraser et al. | Nov. 24, 1953 |